United States Patent
Laverdière-Papineau et al.

(10) Patent No.: US 11,941,379 B1
(45) Date of Patent: Mar. 26, 2024

(54) ACCELERATING STATIC PROGRAM ANALYSIS WITH ARTIFACT REUSE

(71) Applicant: Synopsys, Inc., Mountain View, CA (US)

(72) Inventors: Marc-André Laverdière-Papineau, Calgary (CA); Kenneth Robert Block, Providence, RI (US); Nebojsa Bozovic, Calgary (CA); Simon Fredrick Vicente Goldsmith, Oakland, CA (US); Charles-Henri Marie Jacques Gros, San Francisco, CA (US); Thomas Henry Hildebrandt, Mercer Island, WA (US); Thierry M. Lavoie, Calgary (CA); Ryan Edward Ulch, Calgary (CA)

(73) Assignee: Synopsys, Inc., Sunnyvale, CA (US)

( * ) Notice: Subject to any disclaimer, the term of this patent is extended or adjusted under 35 U.S.C. 154(b) by 28 days.

(21) Appl. No.: 17/901,071

(22) Filed: Sep. 1, 2022

Related U.S. Application Data

(60) Provisional application No. 63/239,540, filed on Sep. 1, 2021.

(51) Int. Cl.
  *G06F 8/36* (2018.01)
  *G06F 8/41* (2018.01)
(52) U.S. Cl.
  CPC ............ *G06F 8/423* (2013.01); *G06F 8/36* (2013.01)
(58) Field of Classification Search
  None
  See application file for complete search history.

(56) References Cited

U.S. PATENT DOCUMENTS

| | | | | |
|---|---|---|---|---|
| 9,176,849 | B2 * | 11/2015 | Tripp | G06F 11/3636 |
| 9,262,132 | B1 * | 2/2016 | Lugton | G06F 8/433 |
| 9,507,694 | B1 * | 11/2016 | Tibble | G06F 8/75 |
| 9,792,114 | B1 * | 10/2017 | Schaefer | G06F 8/75 |

(Continued)

OTHER PUBLICATIONS

Arzt, S. et al. "Reviser: Efficiently Updating IDE-/IFDS-Based Data-Flow Analyses in Response to Incremental Program Changes." ICSE 2014: Proceedings of the 36th International Conference on Software Engineering, May 31-Jun. 7, 2014, pp. 288-298.

(Continued)

*Primary Examiner* — Philip Wang
*Assistant Examiner* — Rongfa P Wang
(74) *Attorney, Agent, or Firm* — Fenwick & West LLP

(57) ABSTRACT

A system performs static program analysis with artifact reuse. The system identifies artifacts associated with the software program being analyzed. The system processes the identified artifacts for performing static program analysis and transmits either the artifacts or identifiers for the artifacts to a second processing device for performing program analysis. The second processing device receives the artifacts and uses the received identifiers to retrieve the artifacts from a networked storage system. The second device also retrieves stored summaries of previous program analysis from the networked storage system. The program analysis uses the retrieved artifacts to generate work units for static program analysis. The analysis is performed only for those work units that are determined to remain unchanged from previous static program analysis cycles.

20 Claims, 9 Drawing Sheets

(56) References Cited

U.S. PATENT DOCUMENTS

| | | | | |
|---|---|---|---|---|
| 2005/0108562 | A1* | 5/2005 | Khazan | G06F 11/3604 726/23 |
| 2007/0168987 | A1* | 7/2007 | Vetillard | G06F 11/3608 717/126 |
| 2020/0225935 | A1* | 7/2020 | Avgustinov | G06F 11/3624 |
| 2021/0240826 | A1* | 8/2021 | Kutt | G06F 21/577 |

OTHER PUBLICATIONS

Cifuentes, C. et al. "Transitioning Parfait Into a Development Tool." IEEE Security & Privacy, vol. 10, No. 3, May-Jun. 2012, pp. 16-23.

Cloutier, N. "Change-Based Approaches for Statis Taint Analyses." Master's Thesis, École Polytechnique de Montréal, Dec. 2018, pp. i-60.

Distefano, D. et al. "Scaling Static Analyses at Facebook." Communications of the ACM, vol. 62, No. 8, Aug. 2019, pp. 62-70.

Rountev, A. et al. "IDE Dataflow Analysis in the Presence of Large Object-Oriented Libraries." International Conference on Compiler Construction, LNCS vol. 4959, Mar. 2008, pp. 53-68.

Rountev, A. et al. "Points-to and Side-Effect Analyses for Programs Built with Precompiled Libraries." International Conference on Compiler Construction, LNCS vol. 2027, Apr. 2001, pp. 20-36.

Ryder, B. G. et al. "Incremental Data-Flow Analysis Algorithms." ACM Transactions on Programming Languages and Systems, vol. 10, No. 1, Jan. 1988, pp. 1-50.

Sadowski, C. et al. "Lessons from Building Static Analysis Tools at Google." Communications of the ACM, vol. 61, No. 4, Apr. 2018, pp. 58-66.

Sadowski, C. et al. "Tricorder: Building a Program Analysis Ecosystem." 2015 IEEE/ACM 37$^{th}$ IEEE International Conference on Software Engineering, May 16-24, 2015, pp. 598-608.

* cited by examiner

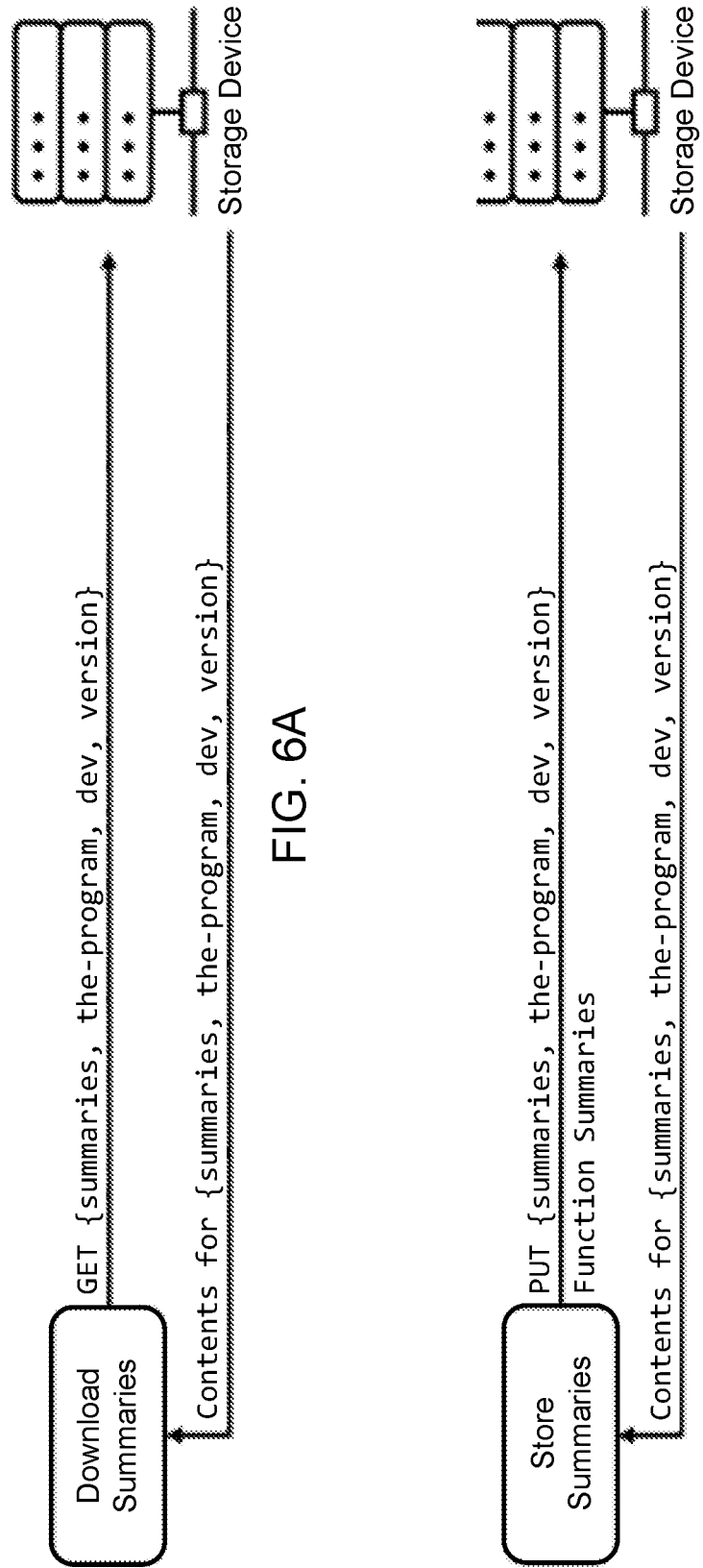

ACCELERATING STATIC PROGRAM ANALYSIS WITH ARTIFACT REUSE

RELATED APPLICATION

This application claims priority under 35 U.S.C. § 119(e) to U.S. Provisional Patent Application Ser. No. 63/239,540, "Accelerating Static Program Analysis with Artifact Reuse," filed Sep. 1, 2021. The subject matter of all of the foregoing is incorporated herein by reference in their entirety.

TECHNICAL FIELD

The present disclosure generally relates to a software analysis system, and specifically to accelerating static program analysis with artifact reuse.

BACKGROUND

Security vulnerabilities and software defects can be identified through software analysis techniques. Static software analysis techniques analyze the software code without executing the code. One type of static software analysis is static whole-program analysis. Static whole-program analysis examines and analyzes data and control flow over a software program, including source code and its libraries. As a result, static whole-program analysis is typically more accurate and offers better guidance on how software engineers can fix detected defects and vulnerabilities. However, this type of analysis can involve a higher volume of data and longer processing times.

SUMMARY

In one aspect, a system includes a network-accessible artifact repository, a capture processing device, a network-accessible summaries repository and an analysis processing device. The capture processing device captures artifacts for a software program of interest. These artifacts are used in a static analysis of the software program of interest. The capture processing device generates a database from the captured artifacts for the software program, which is referred to as an emit database. The emit database contains artifact identifiers for artifacts that are represented in the artifact repository.

The analysis processing device receives the emit database and performs the static analysis of the software program using the artifacts represented in the emit database. The analysis processing device generates a database of the results of the static analysis, which is referred to as the results database. The static analysis is partitioned into work units, and the results database contains summaries of the analysis specified by the work units. Summaries are retrieved from the summaries repository for work units with summaries stored in the summaries repository.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 6A and 6B illustrate further example interactions with a storage device for downloading summaries and storing summaries, according to some embodiments.

DETAILED DESCRIPTION

Figure 1:
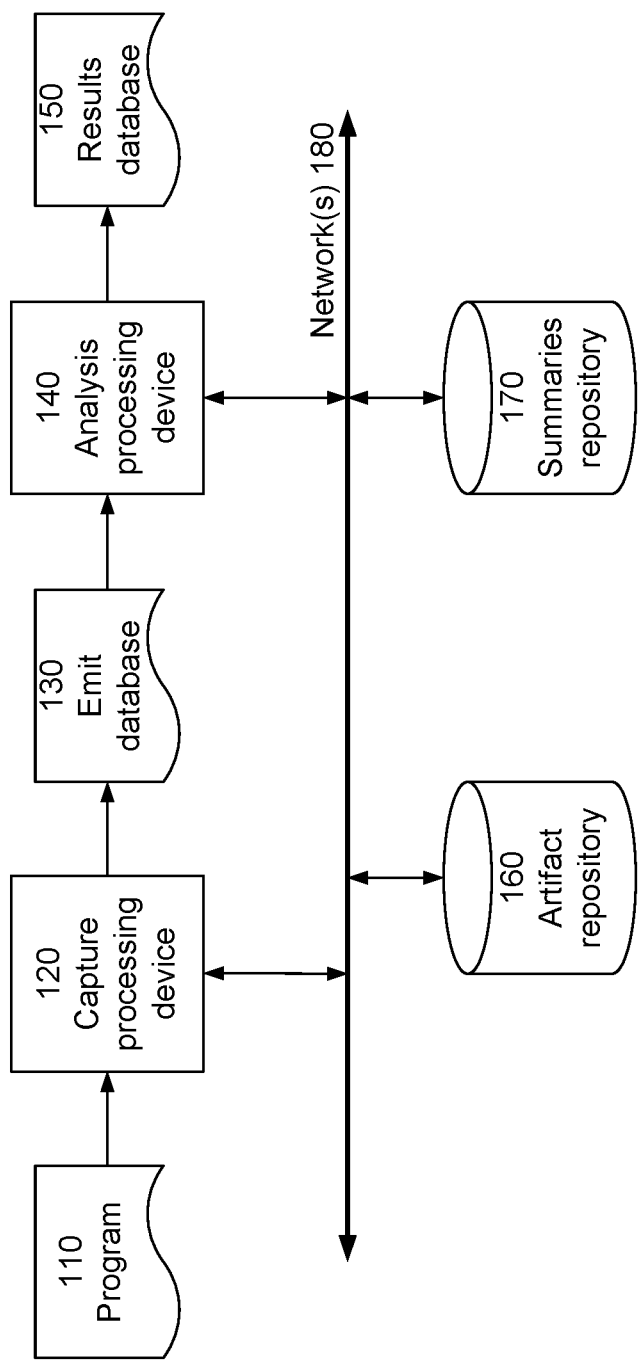
FIG. 1 is a block diagram of a system for performing static whole-program analysis with artifact reuse, according to some embodiments.

Static program analysis determines properties of a software program, such as detecting defects and vulnerabilities, by examining a software program without executing it. Static program analysis may be broadly categorized to include textual analysis, syntactic analysis, intraprocedural analysis, and interprocedural (whole-program) analysis.

Textual analysis of a file may include, for example, determining if certain keywords are present or absent from a program. Applications include the detection of offensive language and verifying that files have copyright and/or license headers.

Syntactic analysis involves understanding a grammar of the input and reaching conclusions based on this additional information. Syntactic analysis may use a parser that transforms artifacts from the program into asbstract syntax trees (AST). For example, some software clone analyses are syntactic.

Intraprocedural analysis examines what happens inside of functions and ignores function calls and call returns. This analysis may transform the AST into a Control Flow Graph (CFG). Traditional Common Subexpression Elimination (CSE) and Constant Propagation (CP) are examples of intraprocedural analyses.

Interprocedural (whole-program) analysis is typically the most powerful and the most resource-consuming. Interprocedural analysis may also use CFGs, but augments them using function call and return edges issuing from a Call Graph (CG). The analysis may avoid re-visiting the same functions many times over by creating function summaries (sometimes called models). Approaches to interprocedural analysis include interprocedural environment transformers (IDE), model checking, and abstract interpretation. The quality of interprocedural analysis' results may be significantly affected by the availability of good summaries of library functions. As with other types of analysis, different analyzers, referred to as checkers, may check for different properties, including defects, quality issues and vulnerability and security issues in the code. While interprocedural analysis may be referred to as "whole-program" analysis, it can also be performed on less than the entire program.

With the rise of continuous integration and continuous delivery (CI/CD) in software engineering practices, the speed at which programs are analyzed is important. In addition, these practices encourage the analysis of programs with small changes between analyses in order to obtain rapid feedback. Thus, a static program analyzer system may analyze a program which is mostly unchanged many times a day.

Aspects of the present disclosure relate to accelerating static program analysis by artifact reuse. Embodiments described herein separate program analysis into two portions, referred to as a capture portion and an analysis portion for reasons that will become apparent. In the capture portion, different artifacts of the program (e.g., source code files, library files, and configuration files) are captured. As part of the capture portion, these may be transformed into a form more suitable for analysis. The analysis portion, which may occur on a separate processing device, performs the static analysis. The analysis examines the captured artifacts for defects, vulnerabilities or other purposes, such as generating function summaries for later use. To accelerate static program analysis, some artifacts may be good candidates for reuse. Identifiers of previously captured artifacts, rather than the actual artifacts, may be transmitted between the capture and analysis phases, and the results from a previous analysis of totally or partially unchanged artifacts (e.g., detected defects, detected vulnerabilities, summaries) may be reused rather than re-analyzing these artifacts.

Separating capture and analysis onto different processing devices can have the following advantages. First, computational requirements of whole-program analysis are typically much greater than computational requirements of program capture. Therefore, dedicating powerful processing devices for analysis allows software development organizations to use less powerful processing devices for program capture. This results in operational savings. In addition, organizations may leverage scalable, on-demand third-party infrastructure, such as the one offered by cloud computing providers. In such an environment, organizations can optimize computing resources by allocating and freeing processing devices as necessary.

Second, software development organizations often use the same artifacts, such as libraries, in different programs they create and maintain. Separating capture and analysis facilitates the reuse of captured artifacts and analysis results, leading to operational savings.

Third, whole-program analysis is typically a time-consuming process, whereas program capture is much quicker. By separating the capture and analysis tasks to different processing devices, organizations can analyze programs asynchronously. This allows capture processing devices to complete rapidly and be used for other useful computations. Organizations using CI/CD practices value rapid completion of tasks, and the rapid termination of the capture phase thus encourages adoption of whole-program analysis.

Furthermore, the separation of the capture and analysis phases leading to reuse as described herein may result in the following advantages, which may be realized by various embodiments.

First, the transmission of a large volume of captured artifacts over a network can be time-consuming. This is especially the case if the devices capturing and analyzing the program are separated by a slower network and/or longer distances. This may be the case for interactions between an organization's network and a cloud computing provider's network. Various embodiments may address this problem by replacing eligible artifact contents with much smaller identifiers (such as cache stubs in some of the examples below) before transmission.

Not all artifacts have characteristics leading to high reuse between analyses, or have characteristics for which their reuse would offer little to no benefit. These characteristics may not be homogenous across programming languages analyzed, technology stacks, and software development practices. As such, the capture device may restrict the operations described herein to artifacts that are good candidates for reuse, which will be referred to as eligible artifacts.

After transmission, the system accesses a network-based storage device to replace the cache stub with the original artifact contents. In some embodiments, the network-based storage device may be part of the analysis device.

Second, artifact decompilation is the transformation of compiled artifacts into a form suitable for analysis, which are termed decompilation artifacts. The term "decompilation" as used herein does not refer to transforming object code back into source code. Rather, it refers to processing the available object code artifacts into a form suitable for the analysis phase. For example, the artifact decompilation process may include extracting class definitions, converting function bodies from a compiled form into a syntax tree and storing this information in the emit database. Artifact decompilation may be time intensive. Various embodiments replace decompilation artifacts with much smaller cache stubs before transmission. After transmission, the system accesses a network-based storage device to replace the cache stub with the original decompilation artifact. In addition to the decompilation process, other processes may be applied to generate other types of derivative artifacts.

Third, it is likely that unchanged parts of a program will have the same defects and vulnerabilities from one analysis to another. The ability to leverage previous analysis information is called incremental analysis. The system accesses a network-based storage device to store summaries of previous analyses, so they can be reused.

FIG. 1 is a block diagram of a system for performing static whole-program analysis with artifact reuse, according to some embodiments. The system includes a capture processing device 120, an analysis processing device 140, an artifact repository 160 and a summaries repository 170. The repositories 160, 170 are network-accessible over network(s) 180. For example, they may be implemented as network-attached storage. The network(s) 180 are represented as a single line in FIG. 1, but the network connectivity between different components may be different. The storage devices for the repositories may have the capability to support storage, retrieval, deletion, and querying for the existence of data over a network.

In one embodiment, the capture device 120 operates in one network, and the storage and analysis devices 140, 160, 170 operate in another high-speed local area network, such as one offered by a cloud computing provider. The two networks may be separated by a long distance and interconnected using a wide area network such as the Internet. One or more intermediary devices may be involved in the communication between the devices. In FIG. 1, each of the components is shown as a single box for the sake of simplicity but this should not be taken as a limitation of the system. The components shown may be implemented by a multiplicity of devices.

The capture processing device 120 performs the capture phase of the static whole-program analysis. The capture phase may be initiated at the request of a user, or as part of an automated process such as a CI/CD pipeline. The capture device 120 gathers artifacts and may also process and/or transform them into a form suitable for the analysis phase.

The artifacts are gathered into what is termed herein as an emit database 130, which may be part of storage on the capture device 120. This phase determines which artifacts belong to the program 110 and gathers them into the emit database 130. The artifacts for a software program may include the source code for the program and libraries called by the program. If the artifact is source code, the capture phase may perform lexicographic and semantic analysis of the artifact and store its results in a format suitable for program analysis, such as ASTs or other representations.

The capture phase may include other processing, transformations and computations, which results are stored in the emit database 130. These may be referred to as derivative artifacts since they are derived from the original program artifacts. One example is decompilation artifacts that are derived by applying the artifact decompilation process to compiled artifacts.

The artifact repository 160 contains previously captured artifacts, including decompilation and other derivative artifacts. When artifacts already exist in the artifact repository, the capture processing device 120 may include an identifier for that artifact in the emit database 130, rather than including the artifact itself. In some implementations, this can also avoid repeating the capture process for artifacts that are derivative.

Not all artifacts are good candidates for reuse, the capture processing device 120 also determines which artifacts are good candidates (referred to as eligible artifacts). For example, library files that are not generated by the build process may often be considered as eligible artifacts.

The identification of whether an artifact is eligible or not may be based in part on the file extension. For example, for Java programs, .jar and .jmod files may be considered to be eligible. Additional criteria may also be used. Consider that many Java programs are built using dependency management software, which automatically downloads specified libraries when running the build. Continuing the Java example, timestamps may be used to distinguish between downloaded files and the files generated during the build. These may include file timestamps on the filesystem. In case that the file system timestamp for a .jar or .jmod file predates the start of the build, the artifact may deemed eligible. In addition, the system may examine the entries in the .jar/.jmod file. These entries have timestamps and the system considers whether those timestamps predate the build.

As another example, the build of a C#program can involve many compilation steps with the output of one step (perhaps a DLL) being used in a later step. In one approach, generated DLLs are tagged in the emit database so that the system does not attempt to apply decompilation to them. If the DLL is a generated DLL, that means the intermediate representations it would contain have already been captured directly from the sources that were used to produce it. Applying the decompilation process would just produce a redundant copy of the same information. Moreover, in the context of caching, source DLLs (as contrasted with generated DLLs) are less subject to change and also more likely to be shared across projects. Removing generated DLLs from eligibility makes DLL caching more effective. This reasoning is also true for generated .jar files.

These are just some examples. Other approaches may be used to determine which artifacts are eligible.

As a result, the emit database 130 may contain the following. First, artifact contents are copies of the captured artifacts. They may optionally be compressed for the sake of efficiency. Second, derivative artifacts are the result of processes performed by the capture processing device 120, such as the artifact decompilation process. Third, cache stubs (or other artifact identifiers) identify the records corresponding to previously captured artifacts in the artifact repository 160.

The emit database 130 may be transmitted to a separate processing device 140 that performs the analysis phase of the static whole-program analysis. Alternatively, the emit database 130 may be stored in the networked artifact repository 160. The emit database 130 may be implemented in different ways, for example as a relational database, a directory structure or a compressed archive.

The analysis processing device 140 performs the analysis phase of the static whole-program analysis. It receives the emit database 130, which may include modified or new artifacts, and cache stubs of previously captured artifacts. The device 140 uses the cache stubs to retrieve stored artifacts from the networked artifact repository 160.

The analysis to be performed is partitioned into smaller analysis tasks, which are referred to as work units. A work unit is a self-contained collection of inputs to a sub-task of the overall analysis task. A work unit thus contains the artifacts or portions of artifacts for the sub-task, any additional data specifying the sub-task, and any data necessary for the sub-task. Work units can be represented deterministically in a binary format, which enables their hashing as described below.

Different checkers may be used for different types of analysis. Checkers may be used to detect defects and/or vulnerabilities in the software program under analysis. In some embodiments, a work unit may contain the syntax trees or other representations of a function to analyze, the set of checkers that will analyze it, function summaries for functions called by the analyzed function, checker options, user configuration that would impact the checkers and framework information. In one approach, the static analysis is partitioned into work units such that each work unit applies all of the desired checkers to a particular subset of functions within the artifacts.

The output of the analysis sub-task specified by a work unit is work unit results, which will also be referred to as summaries for simplicity. For example, summaries may contain function summaries, where the function summary may or may not be specific to the analysis and may be reused in later static analyses. A function summary represents the behavior of a function or equivalent construct in source code. A function summary is computed with regard to the properties of interest for a given analysis. When a given function as well as the functions it transitively calls remain unchanged between analyses, its function summary will remain constant.

Summaries may also contain events, which can be displayed as part of a defect or vulnerability. When the analysis detects a defect or vulnerability, the summary may also contain an identification and description of the defect.

The summaries repository 170 stores summaries from previously completed work units. The analysis processing device 140 determines if records corresponding to the current work units are stored in the summaries repository 170. If so, the analysis device retrieves the relevant summaries from the networked repository 170. If not, the device 140 executes the work units to generate new summaries. The new summaries may also be stored in the summaries repository 170 for use in future analysis phases.

Figure 2A:
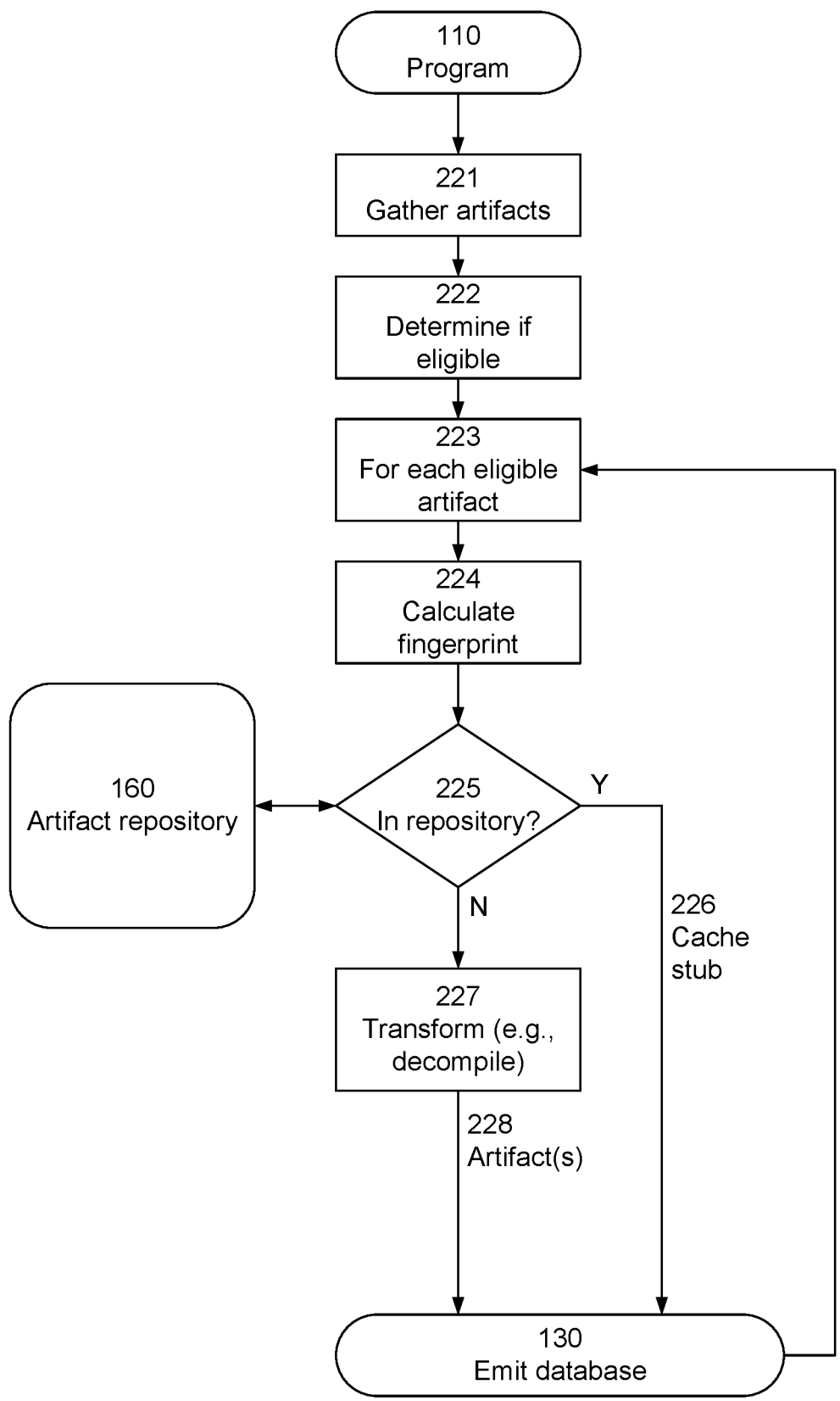
FIG. 2A is a flow diagram that shows an example of the capture phase, according to some embodiments.
Figure 2B:
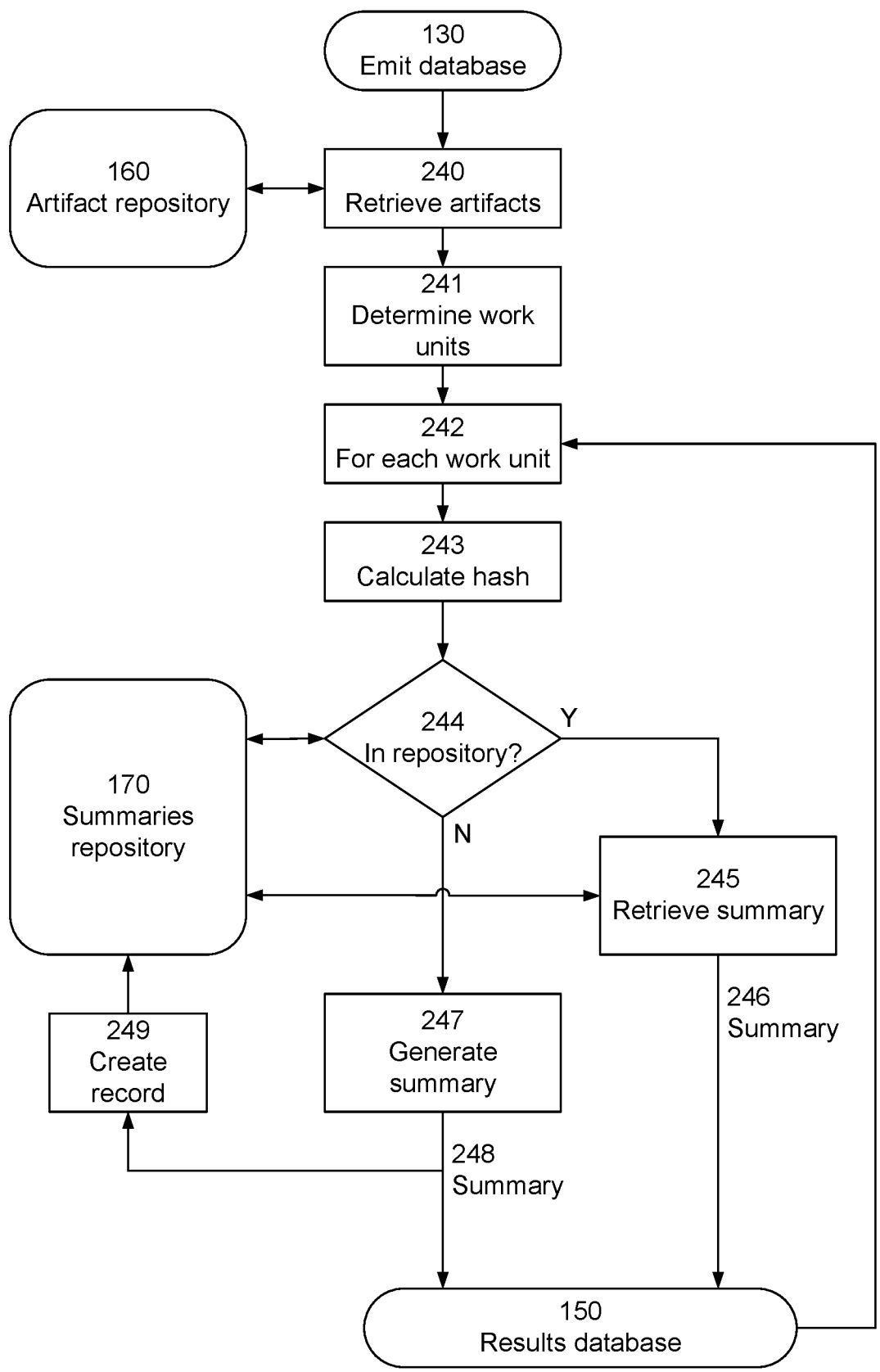
FIG. 2B is a flow diagram that shows an example of the analysis phase, according to some embodiments.

FIGS. 2A and 2B are flow diagrams that show examples of the capture phase and analysis phase, respectively, according to some embodiments. FIG. 2A shows an example of the capture phase. During the capture phase, the system gathers artifacts that are used for performing static analysis of the program 110 and creates an emit database 130 containing this information. At 221, the capture processing device 120 gathers the artifacts associated with the software program of interest 110. This may include source code and libraries. It may also include data files, configuration files and build files. At 222, the capture device 120 determines whether artifacts are eligible or ineligible.

The capture phase includes the following process for each eligible artifact, as indicated by the loop 223. At 224, the capture device computes a fingerprint for the eligible artifact. Fingerprinting is a mechanism that generates a unique identifier for an artifact. The fingerprint may be a cryptographic hash such as MD5 or SHA256, or it may be computed using a content-aware mechanism. Other types of artifact identifiers may also be used. At 225, the capture device 120 communicates with the artifact repository 160 to determine if the fingerprint corresponds to a record already stored in the repository. For example, the artifact repository 160 may use fingerprints as the index to record in the repository. If a corresponding record already exists in the artifact repository 160, the capture device 120 stores a cache stub 226 (or other artifact identifier) in the emit database 130.

Otherwise, the capture device 120 stores the artifact itself 228 in the emit database 130. In some cases, the capture device 120 may also perform some processing, for example artifact decompilation, and store the derived artifact(s) 228 in the emit database 130.

Since each original artifact identified at 221 may be processed to produce a number of artifacts in the emit database 130, the process shown may be repeated separately for different derivative artifacts. For example, one fingerprint may be calculated for the content of an original compiled artifact and a separate fingerprint may be calculated for the decompilation version of the artifact. The artifact repository 160 may be checked for each fingerprint. Cache stubs 226 will be stored in the emit database for those components that are already in the artifact repository and the artifacts themselves 228 will be stored for those which are not. For artifacts of the compiled kind, the capture phase may include applying an artifact decompilation process to the artifact to generate a decompilation artifact. If the decompilation artifact is already available in the artifact repository 160, the artifact decompilation may be skipped and a cache stub for the decompilation artifact is stored in the emit database. In an alternative approach, a single fingerprint may be used to represent both the original artifact and its derivatives.

FIG. 2B shows the analysis phase. During the analysis phase, the system uses the artifacts from emit database 130 and applies different checkers to the artifacts. Each checker performs a different type of analysis for the static whole-program analysis. The results are stored in a results database 150.

At 240, for cache stubs in the emit database 130, the analysis processing device 140 retrieves the corresponding artifacts from the artifact repository 160. At 241, the analysis processing device 140 determines a set of work units for the artifacts. The static whole-program analysis applies a set of checkers to the set of artifacts. This overall task may be partitioned into sub-tasks or work units. In one approach, each work unit specifies that certain checkers are to be applied to certain artifacts (or portions of artifacts).

The analysis phase includes the following process for each work unit, as indicated by loop 242. At 243, the analysis device 140 computes a hash for the work unit. At 244, the analysis device 140 communicates with the summaries repository 170 to determine if the hash corresponds to a record already stored in the repository. For example, the summaries repository 170 may use hashes as the index to record in the repository. A match indicates a work unit that has already been analyzed during a previous static program analysis cycle and therefore does not need to be re-analyzed in the current cycle. These summaries may be tagged with a time stamp or other identifier to indicate that they are current summaries and results of the corresponding work units, and no further program analysis is performed on them. At 245, if a corresponding record already exists in the summaries repository 170, the analysis device 140 retrieves the corresponding summary without having to rerun the work unit. The summary 246 is stored in the results database 150.

At 247, for those work units that are not in repository 170, the analysis device 140 performs the analysis specified by the work unit to generate the corresponding summary. This new summary 248 is stored in the results database 150. At 249, these summaries 248 may be added to the summaries repository 170 by creating records for them, for possible reuse by later analyses. These records may be stored in association with the hash.

The processing steps and their allocation between capture device and analysis device are just an example. Different or additional steps may be included and steps may be allocated differently to devices. For example, decompilation (step 227 in FIG. 2A) is not required to be performed by the capture device 120. Rather, the compiled artifact may be included in the emit database 130 and then the analysis device 140 performs the artifact decompilation. In one implementation, if the decompilation process is to be applied to an artifact, the capture device 120 may determine whether that decompilation is to be carried out by the capture device 120 or by the analysis device 140. If carried out by the analysis device 140, the capture device 120 may include an instruction to perform the decompilation on the information transferred to the analysis device 140. The analysis device 140 may then determine whether to perform the decompilation process or to retrieve the decompilation artifact if it is already in the artifact repository. In another implementation, the capture device 120 may create an emit database that omits derivative artifacts to be generated by the analysis device 140. The analysis device 140 may then detect these omissions and perform the necessary operations to generate the derivative artifacts.

As another example, storing new artifacts in the artifact repository may be performed by either the capture device 120 or the analysis device 140. In the former case, the capture device 120 may add new artifacts 228 to the artifact repository 160 and, since the artifacts 228 are now in the artifact repository, the capture device 120 may include cache stubs in the emit database 130 instead of the full artifact. In the latter case, new artifacts may be transmitted to the analysis device 140 as part of the emit database 130, and then the analysis device 140 adds the new artifacts to the artifact repository 160.

Various steps shown in FIGS. 2A and 2B may also be performed in parallel or in different orders, subject to any dependencies between the steps. Processing steps may optionally compress and decompress data stored in the repositories.

Figure 3:
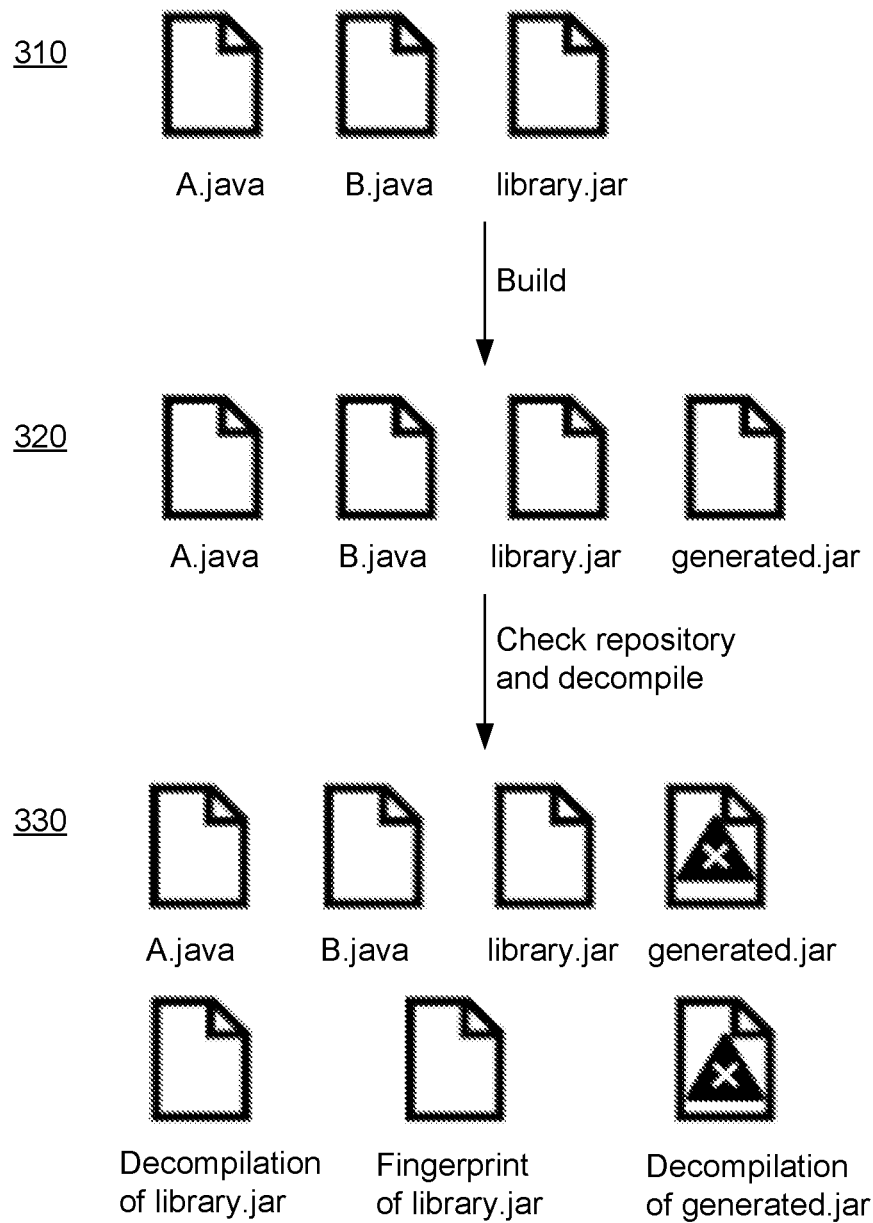
FIG. 3 illustrates an example capture phase for a software program, according to some embodiments.
Figure 4:
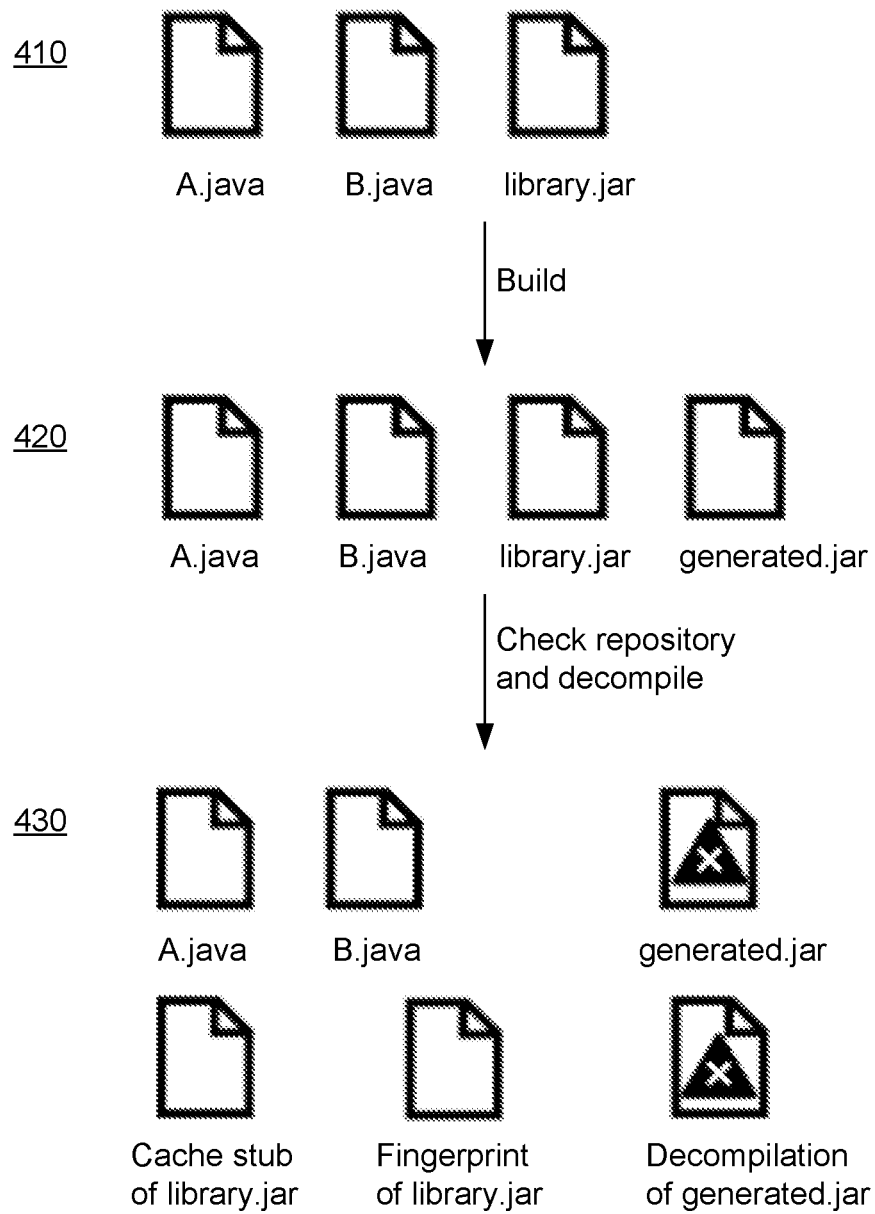
FIG. 4 illustrates a subsequent capture phase for a modified version of the software program of FIG. 3, according to some embodiments.

FIGS. 3-4 depict an example operation in an embodiment of the system. In this example, the system captures and analyzes programs written with the Java programming language. Java programs often use libraries in the Java Archive (Jar) file format. Jar files are typically compressed files containing compiled artifacts. The build process for Java programs may also generate Jar files which contain duplicate definitions. These Jar files may be different from one analysis to the other, and thus may never have the same fingerprint which makes them poor candidates for reuse. In this embodiment, Jar files which are not generated by the build process are considered eligible artifacts and Jar files generated by the build process are not eligible.

FIG. 3 is an example of the capture phase applied to a program for the first time. In FIG. 3, the program of interest includes three files as shown at 310: A.java, B.java and library.jar. A.java and B.java are source code files and library.jar is a pre-compiled library file. The build script for the program compiles B.java and packages it into generated.jar, as shown at 320. In this example, the capture device is configured by the user to execute the build script.

When the system encounters this program for the first time, the capture device determines that generated.jar was generated by the build process. It applies the decompilation process to generated.jar and includes generated.jar and the decompilation version in the emit database, as shown at 330. However, they are marked as ineligible artifacts, as indicated by the X. The capture device also determines that A.java and B.java are not eligible artifacts because they are source code artifacts.

However, the capture device determines that library.jar is an eligible artifact. Consequently, the capture phase computes the fingerprint of library.jar as shown at 330. The capture device queries the artifact repository and determines that library.jar is not available in the repository. The capture device may apply the artifact decompilation process to library.jar to generate its decompilation, as shown at 330.

The capture device thus creates an emit database at 330 with the contents of A.java, B.java, library.jar, generated.jar and decompilation versions of both Jar files. The emit database also includes the fingerprint of library.jar. The artifact generated.jar and its decompilation are marked in the emit database as being ineligible to be reused, as indicated by the x. The emit database may represent eligibility or ineligibility of artifacts using, for example, a Boolean field or a dedicated table. The capture device transmits the emit database 330 to the analysis device. Note that in this example, the capture device does not load new artifacts in the artifact repository.

The analysis device then executes the analysis phase. Since there are no cache stubs in the emit database, no artifacts are retrieved from the artifact repository. The capture device queries the summaries repository for the existence of relevant summaries. Since there are none, no summaries are retrieved either.

The analysis device performs the analysis specified by the work units. While it analyzes the program, it populates the results database with the relevant summaries it computes. The analysis device stores eligible artifacts and summaries in the relevant repositories. The analysis device examines the emit database and determines that only library.jar is eligible. It also communicates with the artifact repository and determines that neither the artifact contents nor the decompilation artifacts of library.jar are in the repository. As a result, the analysis device stores the artifact contents and the decompilation artifacts for library.jar to the artifact repository. Similarly, the analysis device examines the summaries repository and determines that none of the summaries in the database are in the repository. These are then added to the summaries repository.

In FIG. 4, A.java is slightly modified and the modified program is analyzed again. Steps 410 and 420 are the same as in FIG. 3 except that A.java is a modified version. At 420, the capture device determines that generated.jar was generated by the build process and does not replace generated.jar with a cache stub. Instead, the emit database 430 includes identifiers for generated.jar, marked as ineligible.

However, the capture device also determines that library.jar is an eligible artifact. It computes the fingerprint of library.jar, queries the artifact repository, and learns that both the artifact contents and decompilation artifact of library.jar are available in the repository. Thus, the capture device creates an emit database 430 with the cache stub and fingerprint of library.jar, rather than the full contents and decompilation.

After the analysis device receives the emit database, the analysis device retrieves the library.jar artifacts from the artifact repository using the cache stub in the database. It may also retrieve any relevant summaries for the work units for this analysis. The analysis device uses summaries from the results database for unchanged functions and updates the results database with the summaries of changed or additional functions it computes.

In some embodiments, the repositories may be shared in the analyses of many software programs. The capture and analysis devices may be implemented by multiple devices and may communicate with a single storage device that stores the artifact repository and the summaries repository. In such embodiments, increasing sharing of artifact contents and decompilation artifacts across programs is desirable, as it reduces the required storage resources. This is made possible by the fact that many software programs tend to use common libraries.

This is also true for incremental analysis, where different versions of the same software program are analyzed. Successive versions of the same program may be largely the same with changes concentrated in a few sections of the program. In this case, most of the artifacts and summaries may be reused. In one approach, rather than retrieving unchanged artifacts one at a time from the artifact repository, the entire emit database for a version is saved and retrieved for a later version. Then, those artifacts in the emit database that have changed from one version to the next are replaced. A similar approach may be taken with summaries.

On the other hand, it may also be desirable to isolate function summaries of different programs from each other, as different programs are unlikely to have common source code and thus common function summaries. Failing to segregate function summaries could result in significant time and space overhead for little to no benefit. As such, an embodiment of the system may use a program identifier when storing and retrieving function summaries. The analysis device may be configured, for each analysis, with this program identifier. This configuration may be done using a variety of mechanisms, such as environment variables or a configuration file provided alongside the emit database.

Furthermore, software development practices often allow branching or forking in a program development. One way to do so is using multiple branches in a version control system such as git. The software versions in these different branches may vary greatly. These practices result in incremental analysis being able to reuse fewer function summaries across different branches (although significant reuse may still be possible for different versions within each branch).

An embodiment of the system may use a branch identifier, possibly in addition to the program identifier. This configuration may be done using the same mechanisms described above for program identifiers. Those skilled in the art will appreciate that software development projects may use different models, such as various branches in version control system, or various versioning schemes, and that using a branch identifier does not constitute a limitation of the system.

In addition, different versions of the capture and analysis software may be in use. One reason for this is the common practice of IT administrators to gradually upgrade software in their environment. The representation of some artifacts and function summaries may vary between different versions of the static whole-program analyzer. Thus, some embodiments may segregate artifacts and summaries whose representation is not guaranteed to remain constant. An embodiment of this invention may address this issue by using the analysis software's version identifier.

In some embodiments, the repositories may be implemented using a high-availability content addressable web service. The storage device may perform one or more operations on objects in a manner that is transparent to the capture and analysis devices. For example, it may compress, encrypt and deduplicate objects. The storage device may also remove stored objects according to a resource management policy, administrative action, or at the behest of the capture and analysis devices. The storage device may implement access controls to restrict users and components from performing some or all of its capabilities. The storage device may also be a plurality of devices configured to offer high availability and/or redundancy in a transparent manner.

In some embodiments, the storage device may maintain a many-to-many relationship between keys and stored objects. Other embodiments could leverage a variety of communication and storage mechanisms, such as those offered by relational databases, key-value storage services, networked filesystems or other mechanisms.

Figure 7:
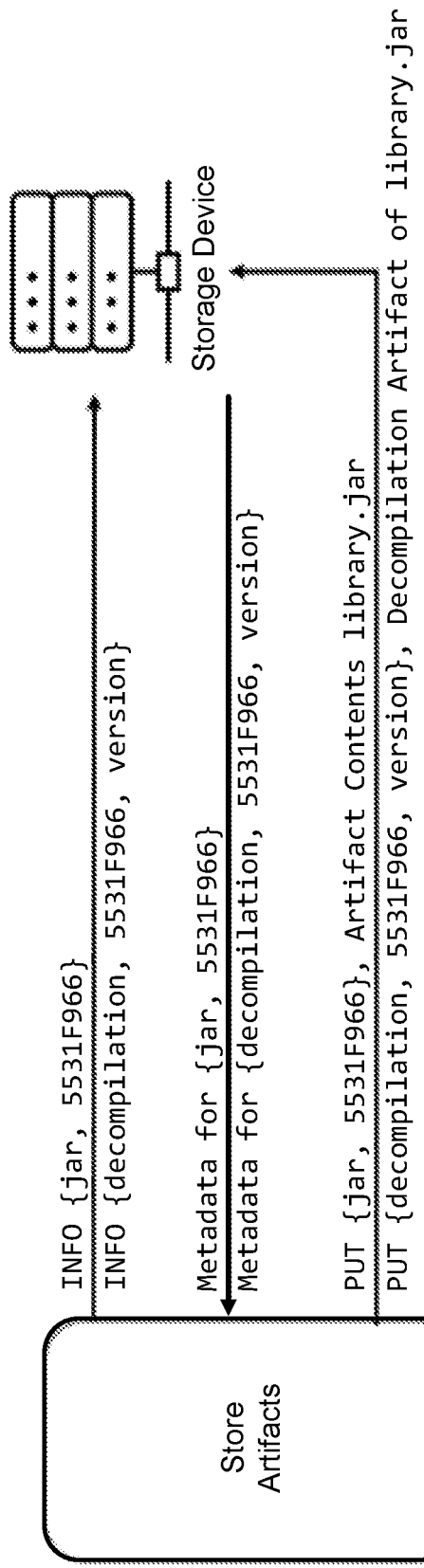
FIG. 7 illustrates further example interactions with a storage device for gathering artifacts, according to some embodiments.

FIGS. 5-7 describe such an embodiment in which the storage device exposes the following operations:
  INFO: given the set of keys (the identifier), return metadata about all stored objects whose keys are a superset of the identifier
  GET: given the set of keys (the identifier), return all stored objects whose keys are a superset of the identifier
  PUT: given a set of keys (the identifier) and datum, store the datum and associate the identifier to it
  INVALIDATE: given a set of keys (the identifier), remove all stored objects whose keys are a superset of the identifier In this embodiment, the fingerprint is computed using a cryptographic hash function. FIGS. 5-7 continue the example described in FIGS. 3-4. The storage device contains the artifact repository and the summaries repository. In this example, the fingerprint of library.jar is "5531F966". Further, the operation over a program named "the-program" and over the development branch "dev" is illustrated. The version of the analysis process is represented by "version". Sets are represented surrounded by curly braces. The strings "jar", "decompilation", "summaries" and "emit" are used for the sake of illustration.

Figure 5A:
FIGS. 5A and 5B illustrate example interactions with a storage device for gathering artifacts and for downloading artifacts, according to some embodiments.

As shown in FIG. 5A, the capture device executes a gather artifacts process. The gather artifacts process computes the fingerprint of library.jar and sends an INFO request to the storage device using the identifier{jar, 5531F966} for the artifact contents and {decompilation, 5531F966, version} for the decompilation artifacts. The storage device, which contains the artifact repository, replies with metadata objects for both identifiers since the artifact repository contains both artifacts. The gather artifacts process thus stores the fingerprint and the cache stub of library.jar in the emit database, corresponding to 430 in FIG. 4.

Figure 5B:
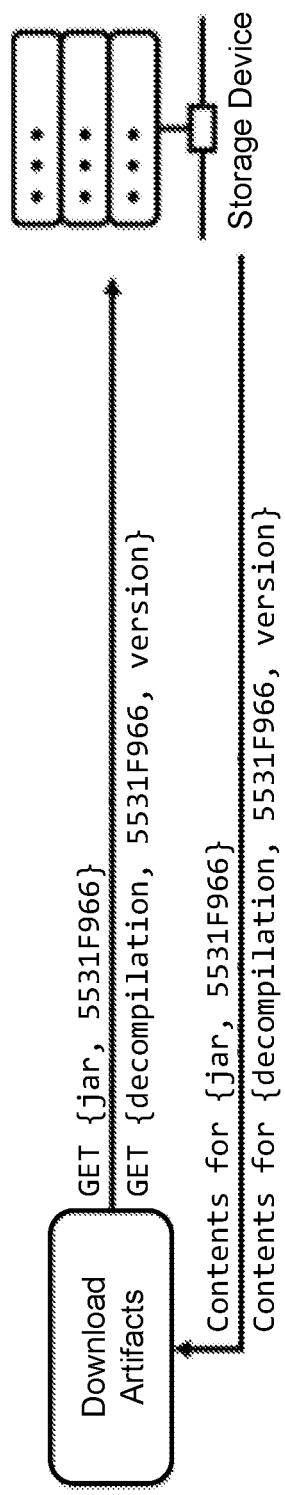

When it receives the emit database, the analysis device executes a download artifacts process shown in FIG. 5B and a download summaries process shown in FIG. 6A in parallel. Since there is a cache stub in the emit database, the download artifacts process retrieves the artifact contents and the decompilation artifact from the storage device using GET requests with identifier{jar, 5531F966} for the artifact contents and {decompilation, 5531F966, version} for the decompilation artifacts, as shown in FIG. 5B.

As shown in FIG. 6A, the analysis device also executes a download summaries process, which retrieves the results database from the storage device using a GET request and the identifier {summaries, the-program, dev, version}.

The analysis device also executes a store summaries process shown in FIG. 6B and a store artifacts process shown in FIG. 7 in parallel. As shown in FIG. 6B, the store summaries process sends a PUT request to the storage device using identifier {summaries, the-program, dev, version}, alongside the results database or a subset thereof.

As shown in FIG. 7, the store artifacts process queries the storage device with identifiers {jar, 5531F966} and {decompilation, 5531F966, version}. If the storage device returns metadata on objects associated with those identifiers, the store artifact process terminates because the artifact repository already contains these particular artifacts. If not, the store artifacts process sends a PUT request to the storage device with the same identifiers alongside their respective data, to store these artifacts in the artifact repository.

For the sake of simplicity, this example did not include the optional step of storing and retrieving the entire emit database. If an embodiment of the system were to do so, it would perform similarly as above, but with an identifier such as {emit, the-program, dev}.

Figure 8:
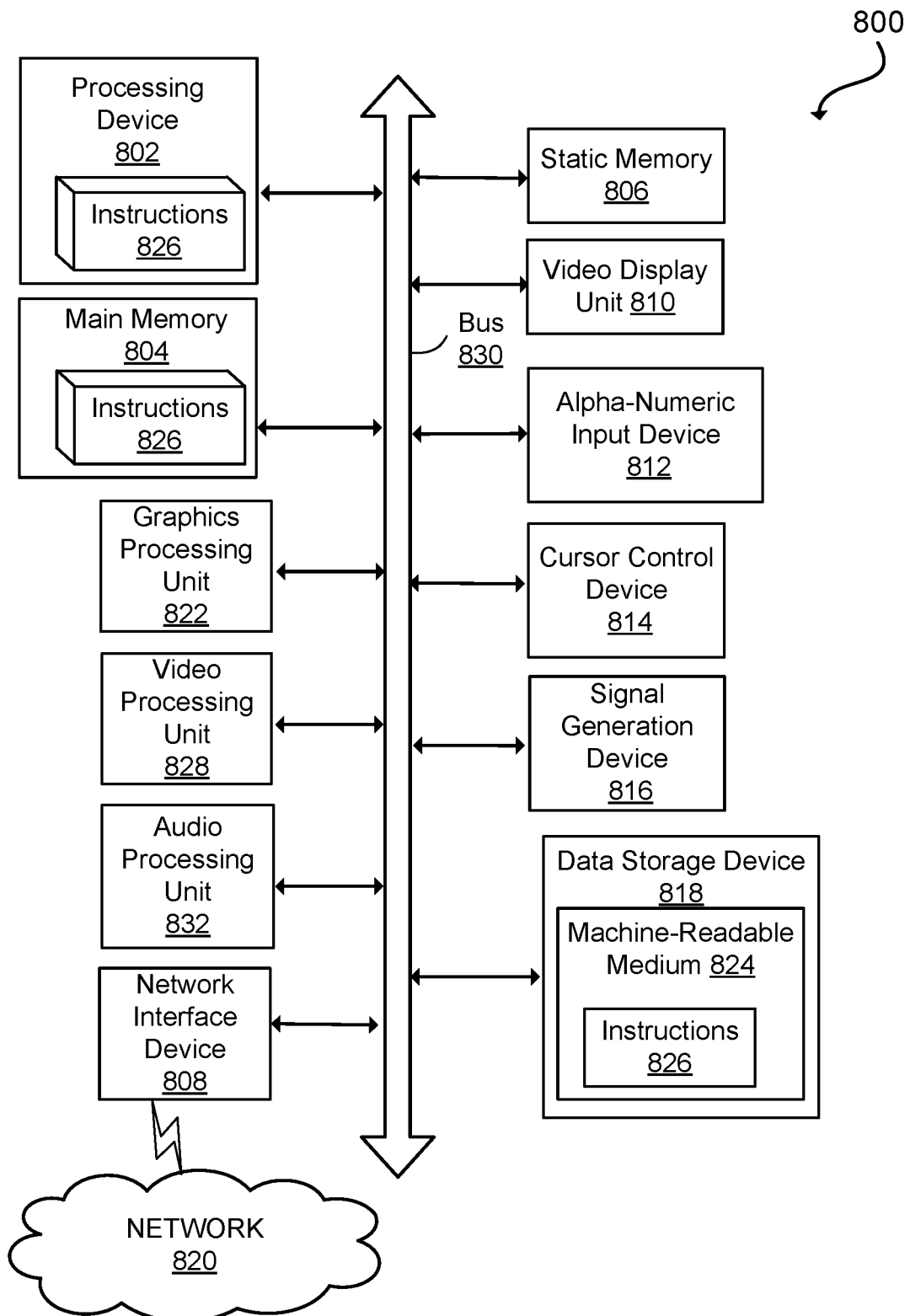
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or an light-emitting diode (LED) display), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a software program stored in the computer. Such a software program may be stored in a computer readable storage medium, such as, but not limited to, any type of disk including optical disks, read-only memories (ROMs), random access memories (RAMs), EEPROMs, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a software program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system comprising:
a memory storing instructions; and
a processor device, coupled with the memory and to execute the instructions, the instructions when executed cause the processor device to:
gather artifacts for a software program, wherein the artifacts are used in a static interprocedural analysis of the software program;

determine whether gathered artifacts are eligible for artifact reuse;

identify at least one of the artifacts determined to be eligible for artifact reuse as having a corresponding record stored in a network-accessible artifact repository; and generate an emit database for the software program, comprising: storing an artifact identifier for the identified artifact in the emit database.

2. The system of claim 1 wherein the artifacts represented in the emit database comprise software code and libraries, and the emit database contains contents of artifacts, derivatives of artifacts, and artifact identifiers.

3. The system of claim 2 wherein the derivatives of artifacts comprise transformations of artifacts into a form suitable for the static analysis.

4. The system of claim 2 wherein at least one artifact is source code, and the transformation of the source code artifact comprises performing syntactical and semantical analysis of the source code artifact.

5. The system of claim 1 wherein the static interprocedural analysis comprises detecting defects and/or vulnerabilities in the software program.

6. A method comprising:

gathering artifacts for a software program, wherein the artifacts are used in a static analysis of the software program;

determining whether gathered artifacts are eligible for artifact reuse;

identifying at least one of the artifacts determined to be eligible for artifact reuse as having a corresponding record stored in a network-accessible artifact repository; and generating, by a capture processing device, an emit database for the software program, comprising:

storing an artifact identifier for the identified artifact in the emit database.

7. The method of claim 6 wherein the emit database contains contents of artifacts, decompilation artifacts, and artifact identifiers; and the decompilation artifacts result from applying an artifact decompilation process to compiled artifacts.

8. The method of claim 6 wherein identifying at least one of the artifacts determined to be eligible for artifact reuse as having a corresponding record comprises:

calculating fingerprints for the artifacts determined to be eligible for artifact reuse; and comparing the fingerprints to fingerprints stored in the records of the artifact repository.

9. The method of claim 6 wherein the corresponding record in the artifact repository contains the content of at least one of the artifacts determined to be eligible for artifact reuse, and the emit database does not contain that content.

10. The method of claim 6 wherein the corresponding record in the artifact repository contains a decompilation artifact of the at least one artifact, and the emit database does not contain that decompilation artifact.

11. The method of claim 6 further comprising:

for at least one of the artifacts determined to be eligible for artifact reuse without a corresponding record stored in the artifact repository, creating a record for that at least one artifact in the artifact repository.

12. The method of claim 11 wherein the created record contains content of the at least one artifact, and at least one derivative of the at least one artifact.

13. The method of claim 6 further comprising:

based on the artifacts represented in the emit database, partitioning the static analysis into a plurality of work units;

identifying at least one of the work units as having a corresponding record stored in a network-accessible summaries repository, the record including a summary of results for analysis specified by the work unit;

retrieving the summary from the summaries repository; and storing the retrieved summary in a results database for the static analysis for the software program.

14. The method of claim 13 further comprising:

for artifact identifiers in the emit database, retrieving the corresponding artifacts from the artifact repository, wherein partitioning the static analysis into a plurality of work units is also based on the retrieved artifacts.

15. A system comprising:

a network-accessible artifact repository that stores artifacts;

a capture processing device configured to capture artifacts for a software program and to generate an emit database for the software program from the captured artifacts; wherein the captured artifacts are used in a static analysis of the software program; and an analysis processing device configured to receive the emit database from the capture processing device and to perform the static analysis of the software program using the artifacts represented in the emit database, including retrieving artifacts stored in the artifact repository, and to generate a results database of the static analysis for the software programs wherein the capture processing device is configured to generate individual emit databases for each of a plurality of software programs, and the analysis processing device is configured to generate individual results databases for each of the plurality of software programs.

16. The system of claim 15 wherein sections of the artifact repository corresponding to libraries are accessible to the capture processing device when generating the emit databases for any of the plurality of software programs.

17. The system of claim 15 wherein records stored in the artifact repository include software program identifiers, and the software program identifiers are used to restrict access to the stored records.

18. The system of claim 17 wherein records stored in the artifact repository further include software program version identifiers.

19. The system of claim 15 wherein the capture processing device performs the static analysis incrementally for a new version of the software program, and the artifact repository is updated according to the incremental performance of the static analysis.

20. The system of claim 19 wherein the incremental static analysis for new versions of the software program comprises:

retrieving the emit database for a prior version of the software program;

updating the emit database for artifacts that have changed from the prior version to the new version; and performing the static analysis using the artifacts represented in the updated emit database.

* * * * *